(12) United States Patent
Kim et al.

(10) Patent No.: US 9,986,244 B2
(45) Date of Patent: May 29, 2018

(54) APPARATUS AND METHOD FOR DETECTING SCENE CUT FRAME

(71) Applicant: MARKANY INC., Seoul (KR)

(72) Inventors: So Won Kim, Seoul (KR); Min Soo Park, Uiwang-si (KR); Ji Seop Moon, Seoul (KR); Euee Seon Jang, Seoul (KR)

(73) Assignee: MARKANY INC., Seoul (KR)

( * ) Notice: Subject to any disclaimer, the term of this patent is extended or adjusted under 35 U.S.C. 154(b) by 0 days. days.

(21) Appl. No.: 15/246,547

(22) Filed: Aug. 25, 2016

(65) Prior Publication Data

US 2017/0223359 A1 Aug. 3, 2017

(30) Foreign Application Priority Data

Jan. 29, 2016 (KR) ........................ 10-2016-0011797

(51) Int. Cl.
*H04N 19/142* (2014.01)
*H04N 19/126* (2014.01)
*H04N 19/172* (2014.01)
*H04N 19/159* (2014.01)

(52) U.S. Cl.
CPC ......... *H04N 19/142* (2014.11); *H04N 19/126* (2014.11); *H04N 19/159* (2014.11); *H04N 19/172* (2014.11)

(58) Field of Classification Search
CPC .. H04N 19/142; H04N 19/126; H04N 19/159; H04N 19/172
See application file for complete search history.

(56) References Cited

U.S. PATENT DOCUMENTS

| 6,449,392 | B1* | 9/2002 | Divakaran | ......... | G06K 9/00711 |
| | | | | | 348/E5.067 |
| 6,735,253 | B1* | 5/2004 | Chang | .................... | G11B 27/28 |
| | | | | | 375/240.16 |
| 2005/0228849 | A1* | 10/2005 | Zhang | ............... | G06F 17/30787 |
| | | | | | 709/200 |
| 2016/0371816 | A1* | 12/2016 | Choudhury | ............. | G06T 5/002 |

* cited by examiner

*Primary Examiner* — Christopher Findley
(74) *Attorney, Agent, or Firm* — Invenstone Patent, LLC (57) ABSTRACT

Provided are an apparatus and a method for detecting a scene cut frame. The apparatus and a method for detecting a scene cut frame includes an image selector configured to select input images by n image frames while shifting an input image at h frame intervals; a candidate frame detector configured to detect a candidate frame from the selected n image frames using at least one of a plurality of codecs and a plurality of scene cut detecting algorithms; and a final frame detector configured to detect a frame having a count value higher than a threshold value as a final scene cut frame by performing histogram analysis based on the detected candidate frame, wherein the h and the n are a real number greater than zero and the h is smaller than the n.

18 Claims, 8 Drawing Sheets

APPARATUS AND METHOD FOR DETECTING SCENE CUT FRAME

CROSS-REFERENCE TO RELATED APPLICATIONS

This application claims the benefit of priority of Korean Patent Application No. 10-2016-0011797 filed on Jan. 29, 2016, all of which are incorporated by reference in their entirety herein.

BACKGROUND OF THE INVENTION

Field of the Invention

The present invention relates to an apparatus and a method for detecting a scene cut part and, more particularly, to a method and apparatus for inserting additional data into an optional position by precisely detecting a scene cut part.

Related Art

In recent years, various multimedia service systems as well as video search through a video index have been developed. In general, since a digital video has a very large amount of data but has a characteristic where a similar image continues in one scene, the video may be efficiently searched by indexing the video in a unit of a scene. In this case, a technology of detecting a scene cut time point to extract a key frame being a representative image of the scene is indispensable to establish a video index and search system.

Further, with the development of a digital technology, a vast amount of digital multi-media data may be easily used. Unlike analog information, the quality of digital information is not damaged so that a large amount of the digital information may be duplicated at a low cost. Such characteristics of the digital information may have a problem in view of a copyright protection. A digital watermarking technology is discussed as a copyright protection solution with respect to digital contents. The watermarking technology is capable of preventing illegal replication of digital contents by inserting an identification (ID) or unique information of a user into the digital contents, protecting a copyright with respect to the digital contents, and representing a base for arguing an ownership.

As described above, it is a very important technology to detect a scene cut in a video stream for the purpose of a video index or inserting the watermark. A detected scene cut may be an image representing a corresponding video upon video indexing or may be an insertion target of the watermark.

However, a method of searching a scene cut part according to the related art includes a method of using a difference of a pixel value or a method of using change of a contour. The above methods have low accuracy to detect the scene cut part using one algorithm. Furthermore, the above methods are not suited to a video to be encoded and decoded through different codecs.

SUMMARY OF THE INVENTION

The present invention provides an apparatus and a method for detecting a scene cut frame capable of improving detecting accuracy of the scene cut region by accumulating unit images selected having a suitable size at a predetermined frame interval to perform histogram analysis with respect to an candidate scene cut frame acquired by using a plurality of codecs or a plurality of scene cut detecting algorithms in parallel.

In an aspect, an apparatus for detecting a scene cut frame is provided. The apparatus includes: an image selector configured to select input images by n image frames while shifting an input image at h frame intervals; a candidate frame detector configured to detect a candidate frame from the selected n image frames using at least one of a plurality of codecs and a plurality of scene cut detecting algorithms; and a final frame detector configured to detect a frame having a count value higher than a threshold value as a final scene cut frame by performing histogram analysis based on the detected candidate frame, wherein the h and the n are a real number greater than zero and the h is smaller than the n.

The candidate frame detector may include: a plurality of candidate frame extracting units configured to extract a candidate scene cut frame from the selected n image frames using the codec and the scene cut detecting algorithm; and a weight calculating unit configured to extract a candidate scene cut frame value by applying a weight to the plurality of candidate scene cut frames.

The frame extracting unit may be operated based on at least one of: a first mode to extract the candidate scene cut frame based on the plurality of codecs and a position of an I frame and an intra-area of a B or P frame which are extracted through the codecs; and a second mode to extract the candidate scene cut frame using the plurality of scene cut detecting algorithms.

The candidate frame detector in the first mode may include: a plurality of codecs configured to encode or decode the selected n image frames; and an I frame and intra-area detectors configured to detect at least one of the position of the I frame and the intra-area of the B or P frame among the n image frames according to the encoding or decoding result of the plurality of codecs; and a candidate selector configured to select the candidate scene cut frame based on the at least one of the position of the I frame and the intra-area of the B or P frame.

The candidate selector may directly select the detected I frame as a first candidate scene cut frame, and may select the candidate scene cut frame based on an occupied ratio of the intra-area of the B or P frame in a corresponding frame.

Each of the plurality of codecs may include a plurality of codecs having different bit rates, and the plurality of codecs are operated in parallel to having different bit rates to detect at least one of the I frame and the intra-area of the B or P frame.

The I frame and intra-area detector may adopt a position of the I frame and an intra-area of the B or P frame from the second frame except for the first frame in the n image as a detecting target.

The plurality of codecs may include a high efficiency video coding (HEVC) codec and an advanced video coding (AVC) codec, and a WebM codec.

The final frame detector may include: an input unit configured to receive a candidate scene cut frame value detected through at least one of the plurality of codecs or the plurality of scene cut detecting algorithms; a count value accumulating unit configured to accumulate a count value by performing histogram analysis with respect to the candidate scene cut frame value; and a frame detecting unit configured to detect a final scene cut frame by determining whether the accumulated count value is higher than a threshold value or based on top m frames of the accumulated count value, where, the m is a natural number.

The apparatus may further include an additional data insertion unit configured to insert additional data into the detected final scene cut frame.

The h may be changed.

In another aspect, a method for detecting a scene cut frame is provided. The method includes: receiving input images; selecting input images by n image frames while shifting the input image at h frame intervals; detecting a candidate scene cut frame from the selected n image frames using at least one of a plurality of codecs and a plurality of scene cut detecting algorithms; and detecting a frame having a count value higher than a threshold value as a final scene cut frame by performing histogram analysis based on the detected candidate frame, wherein the h and the n are a real number greater than zero and the h is smaller than the n.

The detecting of the candidate scene cut frame may include: extracting a candidate scene cut frame from the selected n image frames using the codec and the scene cut detecting algorithm; and extracting a candidate scene cut frame value by applying a weight to the plurality of candidate scene cut frames.

The extracting of the candidate scene cut frame may include: operating based on at least one of: a first mode to extract the candidate scene cut frame based on the plurality of codecs and a position of an I frame and an intra-area of a B or P frame which are extracted through the codecs; and a second mode to extract the candidate scene cut frame using the plurality of scene cut detecting algorithms.

The extracting of the candidate scene cut frame in the first mode may include: encoding or decoding the selected n image frames by a plurality of codecs; and detecting at least one of the position of the I frame and the intra-area of the B or P frame among the n image frames according to the encoding or decoding result of the plurality of codecs; and selecting the candidate scene cut frame based on the at least one of the position of the I frame and the intra-area of the B or P frame.

The selecting of the candidate scene cut frame comprises at least one of: directly selecting the detected I frame as a first candidate scene cut frame; and selecting the candidate scene cut frame based on an occupied ratio of the intra-area of the B or P frame in a corresponding frame.

Each of the plurality of codecs may include a plurality of codecs having different bit rates, and the plurality of codecs are operated in parallel to having different bit rates to detect at least one of the I frame and the intra-area of the B or P frame.

The detecting at least one of the position of the I frame and the intra-area of the B or P frame may include adopting a position of the I frame and an intra-area of the B or P frame from the second frame except for the first frame in the n image as a detecting target.

The plurality of codecs may include a high efficiency video coding (HEVC) codec and an advanced video coding (AVC) codec, and a WebM codec.

The detecting the frame as the final scene cut frame may include: receiving a candidate scene cut frame value detected through at least one of the plurality of codecs or the plurality of scene cut detecting algorithms; accumulating a count value by performing histogram analysis with respect to the candidate scene cut frame value; and detecting a final scene cut frame by determining whether the accumulated count value is higher than a threshold value or based on top m frames of the accumulated count value, where, the m is a natural number.

The method may further include inserting additional data into the detected final scene cut frame.

The h may be changed.

In accordance with the apparatus and the method for detecting the scene cut frame according to an embodiment of the present invention, instead of using one codec or one scene cut detecting algorithm, the detecting accuracy of the scene cut frame can be improved by performing histogram analysis with respect to a candidate scene cut frame acquired by repeatedly applying a plurality of codecs or a plurality of scene cut detecting algorithms to an image frame in a predetermined unit.

Further, in accordance with the apparatus and the method for detecting the scene cut frame according to an embodiment of the present invention, a security efficiency and an efficiency of a watermark strength can be improved by inserting a watermark into the detected scene cut frame.

In addition, in accordance with the apparatus and the method for detecting the scene cut frame according to an embodiment of the present invention, a representative image of a corresponding video session can be suitably extracted by using the detected scene cut frame as an index of a specific video.

DESCRIPTION OF EXEMPLARY
EMBODIMENTS

Rather, these example embodiments are provided so that this disclosure will be thorough and complete, and will fully convey the scope of the present inventive concept to those skilled in the art.

However, the embodiment is not limited to the specific embodiment, but the embodiment includes all modifications, equivalents, and substitutes belonging to the technical scope of the embodiment without departing from the spirit of the embodiment.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

In addition, when a component is referred to as being "connected to" or "linked to" another component, the component may be directly connected to or linked to another component or an intervening component may be present therebetween. In contrast, if a component is referred to as being "directly connected to" or "directly linked to" another component, an intervening component may not be present therebetween.

The terms used in the specification are for the purpose of explaining specific embodiments and have no intention to limit the disclosure. Unless the context indicates otherwise, the singular expression may include the plural expression. In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

Unless defined otherwise, the terms including technical and scientific terms used in this specification may have the meaning that can be commonly apprehended by those skilled in the art. The terms, such as the terms defined in the commonly-used dictionary, must be interpreted based on the context of the related technology and must not be interpreted ideally or excessively.

Hereinafter, exemplary embodiments will be described in more detail with reference to accompanying drawings. In the following description, for the illustrative purpose, the same components will be assigned with the same reference numerals, and the repetition in the description about the same components will be omitted in order to avoid redundancy.

Configuration of Apparatus for Detecting Scene Cut Frame

Figure 1:
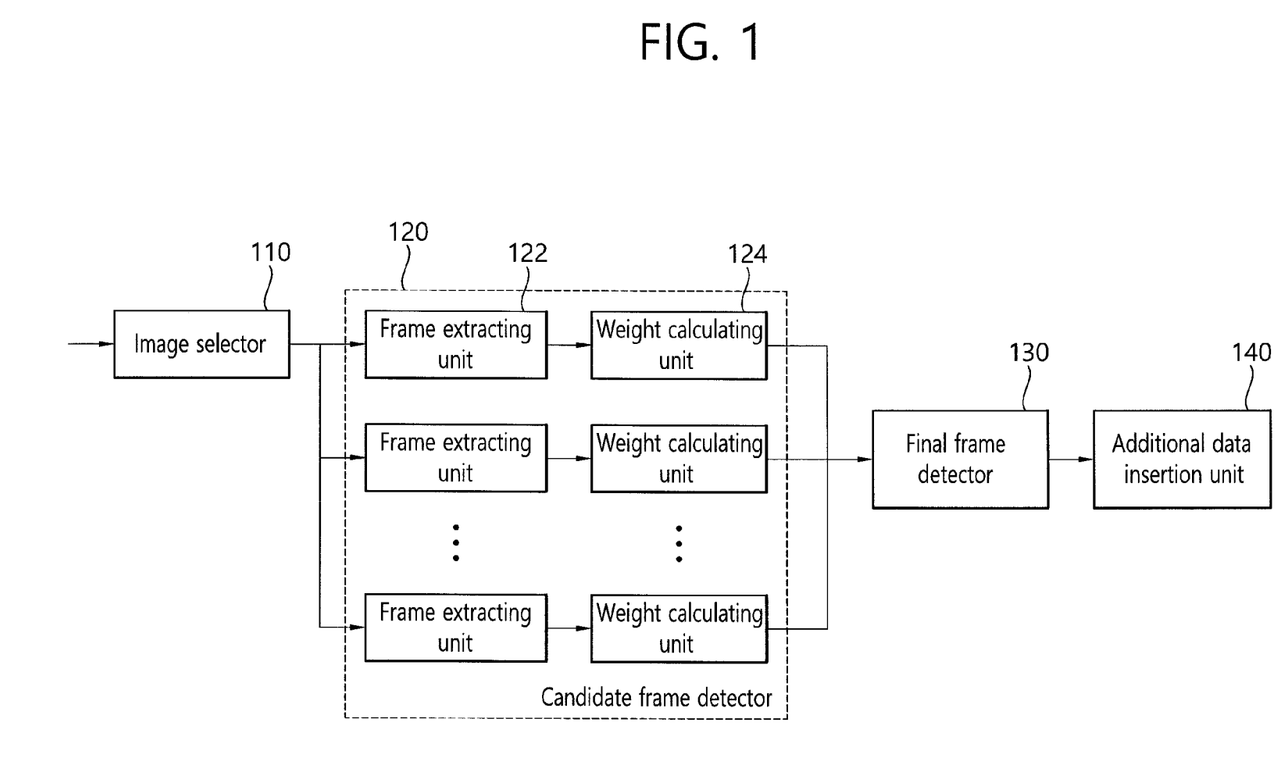
FIG. 1 is a block diagram illustrating a configuration of an apparatus for detecting a scene cut frame according to an embodiment of the present invention.

FIG. 1 is a block diagram illustrating a configuration of an apparatus for detecting a scene cut frame according to an embodiment of the present invention. As shown in FIG. 1, the apparatus for detecting a scene cut frame according to an embodiment of the present invention may include an image selector 110, a candidate frame detector 120, a final frame detector 130, and an additional data insertion unit 140. Each constituent element may be configured by one hardware processor, and a plurality of constituent elements may be integrally configured by one processor. Further, commands or data associated with respective constituent elements are stored in a memory (not shown) connected to a processor so that related data may be provided to the processor.

Referring to FIG. 1, the apparatus for detecting a scene cut frame may receive a moving image bit stream to detect a scene cut frame in the moving image bit stream. The apparatus for detecting a scene cut frame may include a broadcasting server device for transmitting a broadcasting stream, an encoder for encoding a moving image stream, a server device for transmitting or streaming a VOD stream, and the like. Hereinafter, respective constituent elements of the apparatus for detecting a scene cut frame will be described in detail.

The image selector 110 receives a moving image stream and divides the moving image stream in a specific unit to select one image. The image selector 110 selects a unit frame having a specific size while shifting the image at h frame intervals to transmit the selected frame to the candidate frame detector 120 so that the candidate frame detector 120 may detect a candidate scene cut frame from the selected frame. In this case, the unit frame may be set as n frames. In this case, both of the n and the h are a real number greater than 0. Further, the h may be smaller than the n.

The divided unit image frame is provided to the candidate frame detector 120. The candidate frame detector 120 may include a plurality of frame extracting units 122 and a plurality of weight calculating units 124 which are connected to the frame extracting units 120, respectively. Each of the frame extracting units 122 receives the unit image frame divided and selected from the image selector 110 to extract a candidate scene cut frame in each unit image. The frame extracting unit 122 may include a plurality of codecs (encoders/decoders). Alternatively, the frame extracting unit 122 may include a plurality of scene cut detecting algorithm executors. Alternatively, the frame extracting unit 122 may include a combination of codecs and scene cut detecting algorithm executors.

The candidate scene cut frame in a corresponding unit image is found through the frame extracting unit 122. In this case, the candidate frame or the candidate scene cut frame is not detected as a final scene cut frame, but refers to a frame having a high possibility to be selected as the final scene cut frame through weight calculation or other algorithms (for example, a histogram analysis or the like). A plurality of candidate scene cut frames may be detected from the selected image. Furthermore, attributes of the candidate scene cut frame may be changed. For example, one may be an intra-coded (I) frame. A remaining one may be a frame having a ratio of an intra-area greater than a predetermined threshold of a P frame (Predictive-coded picture) and a B frame (Bidirectional-coded picture). In this case, the I frame means a frame decoded through intra prediction without referring to other frames. The P frame may be a frame with reference to a unidirectional picture and the B frame may be a frame with reference to a bidirectional picture. In addition, when the frame extracting unit 122 is the scene cut detecting algorithm executor instead of a codec, the frame detected through a corresponding algorithm may be the candidate scene cut frame.

When a unit image is partially repeated because the h is smaller than the n, the frame extracting unit 122 may extract the candidate scene cut frame from the repeated unit image part.

The frame extracting unit 122 may receive frame time information or frame index information on respective input frames from a predetermined memory (e.g., frame buffer). In addition, the frame extracting unit 122 may extract the candidate scene cut frame through the above codec or scene cut detecting algorithm, may apply a flat whether or not a corresponding frame is the candidate scene cut frame or may display or identify time information or an index of the frame selected as the candidate scene cut frame on a time line. Through the above method, identification information with respect to another constituent element and the candidate scene cut frame may be shared.

The weight calculating unit 124 multiplies the candidate scene cut frame selected through the frame extracting unit 122 by a suitable weight. The weight may be applied to the each frame calculating unit 124, and the weight applied candidate scene cut frame value is provided to the final frame detector 130.

The final frame detector 130 may perform histogram analysis based on the weight applied candidate scene cut frame value to detect a candidate frame having a count value higher than a threshold value as the final scene cut frame. In this case, the histogram analysis may include calculation to calculate summation of the weight applied candidate scene cut frame value. In addition, the final frame detector 130 applies a flag to the final scene cut frame to identify whether the corresponding frame is the scene cut frame or records an index value of the final scene cut frame so that other devices may directly recognize the identified scene cut frame later.

The additional data insertion unit 140 may insert additional data such as the watermark into a frame determined by the final frame detector 130 as a final scene cut frame.

Selection of Image Frame

Figure 2:
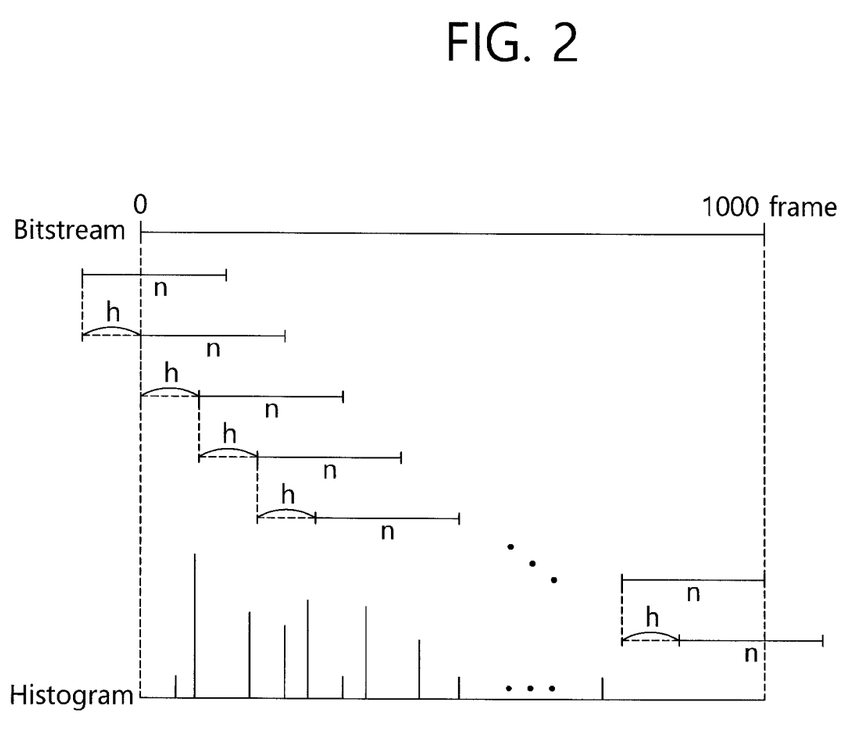
FIG. 2 is a concept diagram illustrating a procedure of selecting an image frame in a predetermined unit by an image selector.

FIG. 2 is a concept diagram illustrating a procedure of selecting an image frame in a predetermined unit by an image selector.

The image selector divides an input bit stream into n units to provide the divided stream. In this case, the image selector may include a configuration for shifting an image by h frames and a configuration for selecting only n frames before a shifted section.

In the embodiment of the present invention, the image selector may divide the bit stream into a range of 0 frame to 1000 frame. In this case, when the bit stream is encoded and decoded to have a rate of 50 fps, the 1000 frames may have a time interval of 20 seconds, and the frames may time information, respectively. In this case, h frames may be advanced and selected with respect to the 0 frame which is a first part of the bit stream. That is, in a view of a concept, (0-h) to n frames may be divided, selected, and provided to the candidate frame detector.

Next, the image selector again divides, selects, and provides n frames by passing over h frames with respect to a next interval to the candidate frame detector. Such a procedure is repeatedly performed until the 1000 frame is selected and provided. Further, in an end part of the bit stream, n unit images are selected to pass over the 1000 frame by passing over the frames at an h interval so that all image frames in the bit stream may be selected without omission.

According to the embodiment of the present invention, it preferable that the h is smaller than the n. When the h is greater than the n, the frame is shifted by a corresponding value of the h greater than the n upon selection of a next image, a partial frame of the bit stream may not be selected. When the h is the same as the n, since there is no overlapped part, there may be a scene cut frame which is not extracted. For example, when the frames are divided in a group of pictures (GOP) unit, since a first frame of a next unit image may be excluded from a detecting target, even the scene cut frame may not be detected. In order to prevent this, in the present invention, the h may be designed to be smaller than the n so that there is an overlapped frame. The scene cut part may be detected depending on a plurality of codecs or scene cut detecting algorithms without depending on one code or one scene cut detecting algorithm.

It may be preferable that a divided and selected unit image may be overlapped with at least one frame. The h and the n may be defined by user setting. This may be always and optionally changed by a user through a user interface (not shown) later. For example, the n may have a value of 60, 120, 240 . . . . The h may have a value of 10, 20, 7.5 . . . . In some cases, the h is set in a time unit instead of a frame unit and may be set as 0.2 second, 0.4 second, or 0.15 second at 50 fps. That is, a unit of the h is not necessarily the same as a unit of the n.

According to the embodiment of the present invention, the n may be a value indicating a specific GOP unit. However, in this case, it is preferable that the h is different from the GOP value.

Selection of Candidate Scene Cut Frame

Figure 3:
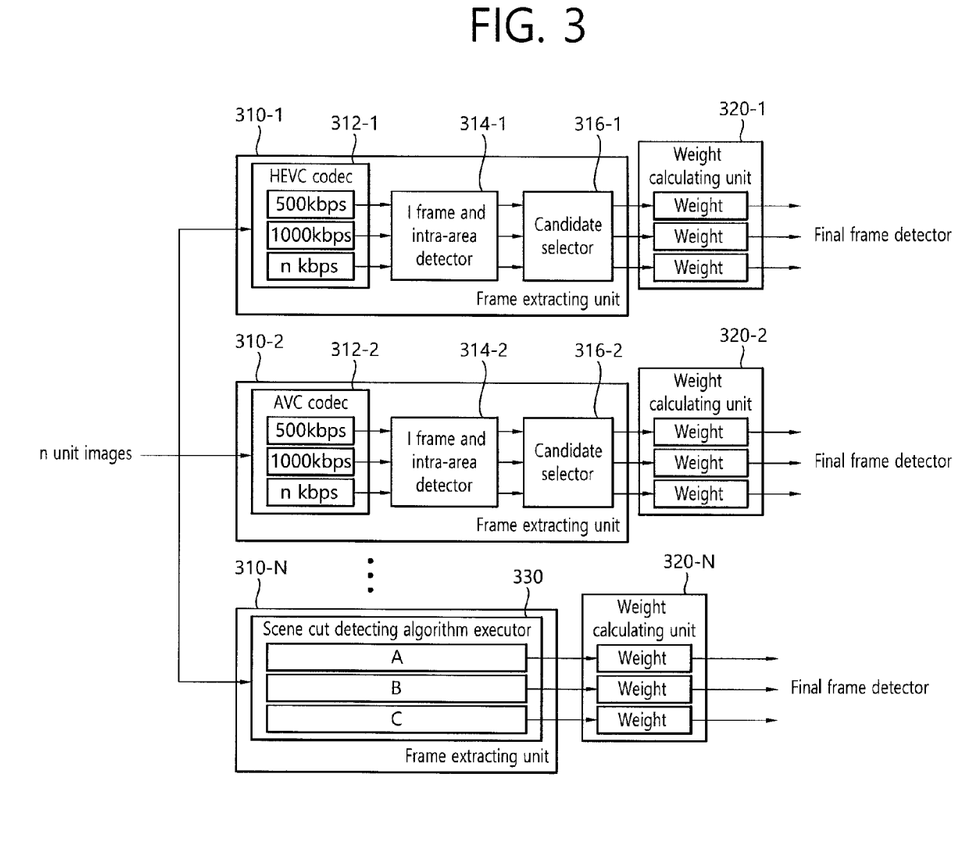
FIG. 3 is a block diagram illustrating a configuration of a candidate frame detector in detail.

FIG. 3 is a block diagram illustrating a configuration of a candidate frame detector in detail. As shown in FIG. 3, the candidate frame detector according to the embodiment of the present invention may include a plurality of frame extracting units 310-1 to 310-N and a plurality of weight calculating units 320-1 to 320-N.

Referring to FIG. 3, the plurality of frame extracting units 310-1 to 310-N may be operated in two modes. One mode uses a codec algorithm, and a remaining mode uses a scene cut detecting algorithm.

When the codec algorithm is used, the frame extracting units 310-1 to 310-N may include a plurality of codecs 312-1 and 312-2, I frame and intra area detectors 314-1 and 314-2, and candidate selectors 316-1 and 316-2. The plurality of codecs 312-1 and 312-2 receive n image frames as a frame unit to perform encoding and decoding in respective schemes. According to the embodiment of the present invention, the codecs 312-1 and 312-2 may include an HEVC (High Efficiency Video Coding: H.265) codec, an AVC (Advanced Video Coding: H.264) codec, a H.263 codec, a H.262 codec, a H.261 codec, a MPEG-1 codec, a MPEG-2 codec, a MPEG-4 codec, a WebM codec, a VC-1 codec, a VP46 codec, a VP7 codec, a WMV codec, a AMV codec, and an AVS codec. In this case, one codec 310-1 or 301-2 may perform the encoding and the decoding to include a plurality of different bitrates.

The I frame and intra area detectors 314-1 and 314-2 may detect at least one of a position of an I frame and an intra-area among n frame unit images according to an encoding or decoding result according to each bitrate of the codecs 310-1 and 301-2. In this case, the intra-area may signify an intra-encoding and decoding blocks of a B frame or a P frame. For example, the I frame and intra area detector 314-1 receives an encoding or decoding result at 500 kbps of an HEVC codec 312-1. When at least one frame among corresponding unit frames is encoded or decoded as a I frame, the I frame and intra area detector 314-1 may detect the encoded or decoded frame to transmit the above frame to the candidate selector 316-1. In addition, the I frame and intra area detector 314-1 may detect an intra-encoded or decoded area in the P or B frame to transmit the above area to the candidate selector 316-1.

The candidate selectors 316-1 and 316-2 receive at least one of I frame relation information (e.g., frame identification information (time information, index information, and the like) and intra-area information of the B or P frame to finally determine whether to select the corresponding frame as the candidate scene cut frame. The candidate selectors 316-1 and 316-2 directly select the I frame as the candidate scene cut frame. In a case of the B or P frame, the candidate selectors 316-1 and 316-2 calculates an occupied ratio of an intra-block in a corresponding frame from the intra-area information of the corresponding frame to determine whether the ratio of the intra-block is equal to or greater than a specific threshold value. When the ratio of the intra-block is equal to or greater than a specific threshold, the candidate selectors 316-1 and 316-2 may select the corresponding frame as the candidate scene cut frame. In this case, the threshold value may be defined by user setting, and may be optionally changed by the user interface.

Through the procedure of selecting the candidate scene cut frame using the codec, the finally selected candidate scene cut frame is multiplied by the weight through the weight calculating units 320-1 and 320-2 so that the weight applied final candidate scene cut frame may be provided to a final frame detector 130.

When the scene cut detecting algorithm is used, a scene cut detecting algorithm executor 330 directly detects the candidate scene cut frame through a plurality of scene cut detecting algorithm. That is, unlike a case of using the codec, a candidate frame may be directly selected without confirming whether a corresponding frame is the I frame and a ratio of the intra-area. A weight is directly applied to the selected candidate scene cut frame by the weight calculating unit 320-N so that the weight applied candidate scene cut frame may be provided to a final frame detector 130.

According to the embodiment of the present invention may include a template matching method using a difference in pixel values, a histogram comparison method using a difference in histograms, a method using change in an edge, and a method using block matching.

The template matching method using a difference in pixel values calculates a difference between two pixel values having the same spatial position between two frames which are temporally adjacent to each other to use the difference as a factor for detecting scene cut. The histogram comparison method expresses brightness components or color components as a histogram to use a histogram difference between frames. The method using change in an edge detects an edge of an object in an image to detect scene cut using the change in the edge of the object. When the scene cut is not generated, a position of an edge of a current frame is similar to a position of an edge of a previous frame. Conversely, when the scene cut is generated, the position of an edge of a current frame differs from the position of an edge of a previous frame. The method using block matching uses the block matching to detect a similar block between two adjacent frames as a factor for detecting the scene cut, and divides the image into a plurality of blocks which are not overlapped with each other, and detects the most similar block from the previous frame with respect to each block. Further, the method using block matching expresses a difference with the most similar block which is found as a value of 0 to 1, and generates a difference between the frames by passing the above values through a non-linear filter, and determines whether the scene cut is generated based on the difference between the frames.

The weight calculating units 320-1 to 320-N multiply a candidate frame by a corresponding weight allocated to an encoding/decoding result according to each codec or a specific bitrate, and/or each scene cut detecting algorithm to a weight calculation value with respect to a specific candidate frame to the final frame detector 130. In this case, the weight may be selectively allocated by a user. It is preferable that the weight may be allocated in such a way that a higher weight is applied to a codec (bitrate of the codec) or the scene detecting algorithm having high accuracy.

Figure 4:
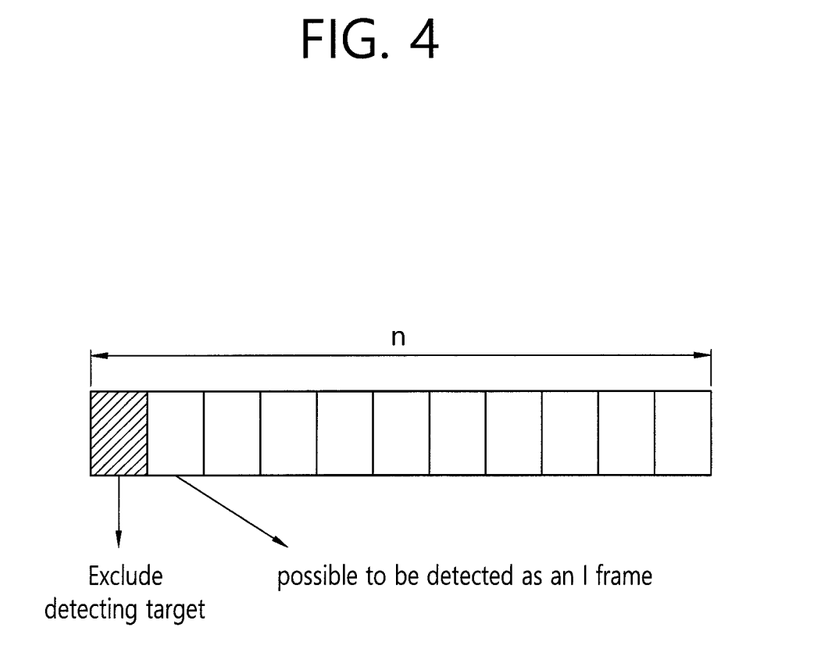
FIG. 4 is a diagram illustrating a region for detecting a candidate scene cut frame.

FIG. 4 is a diagram illustrating a region for detecting a candidate scene cut frame.

Referring to FIG. 4, when n unit images enter, the candidate frame detector 120 may adopt the second frame to the n-th frame except for a first frame as a detecting target of the candidate scene cut frame. In other words, the candidate frame detector 120 may extract a position of the I frame and a position of an intra-area from the second frame except for the first frame.

Detection of Final Scene Cut Frame

Figure 5:
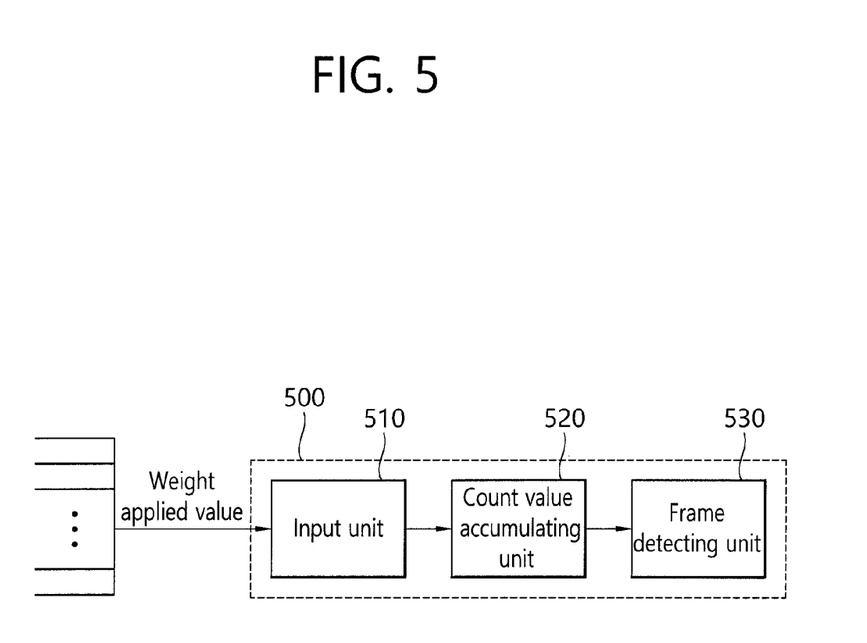
FIG. 5 is a detailed block diagram illustrating a configuration of a final frame detector.

FIG. 5 is a detailed block diagram illustrating a configuration of a final frame detector. As shown in FIG. 5, a final frame detector 500 according to the embodiment of the present invention includes an input unit 510, a count value accumulating unit 520, and a frame detecting unit 530.

Referring to FIG. 5, the input unit 510 receives the candidate scene cut frame by which the weight is multiplied through a weight calculating unit.

Further, the count value accumulating unit 520 receives a value obtained by multiplying a candidate frame selected through each codec (or bitrate in the codec) and/or each scene cut detecting algorithm by a weight allocated to a corresponding codec or algorithm from the input unit 510 to perform histogram analysis by frames. The histogram analysis accumulates all weights calculated with respect to each frame using a frame axis to calculate the count value. The count value is calculated by individual frames, and the calculated count value is provided to the frame detecting unit 530.

The frame detecting unit 530 may apply a threshold value based on the count value calculated by frames to detect a frame corresponding to a higher 60% in a specific frame section as the final scene cut frame. Alternatively, the frame detecting unit 530 may a frame having a count value higher than a specific count value of 50 by determining the threshold value as the specific count value. In this case, the threshold value may be defined by user setting.

Figure 6:
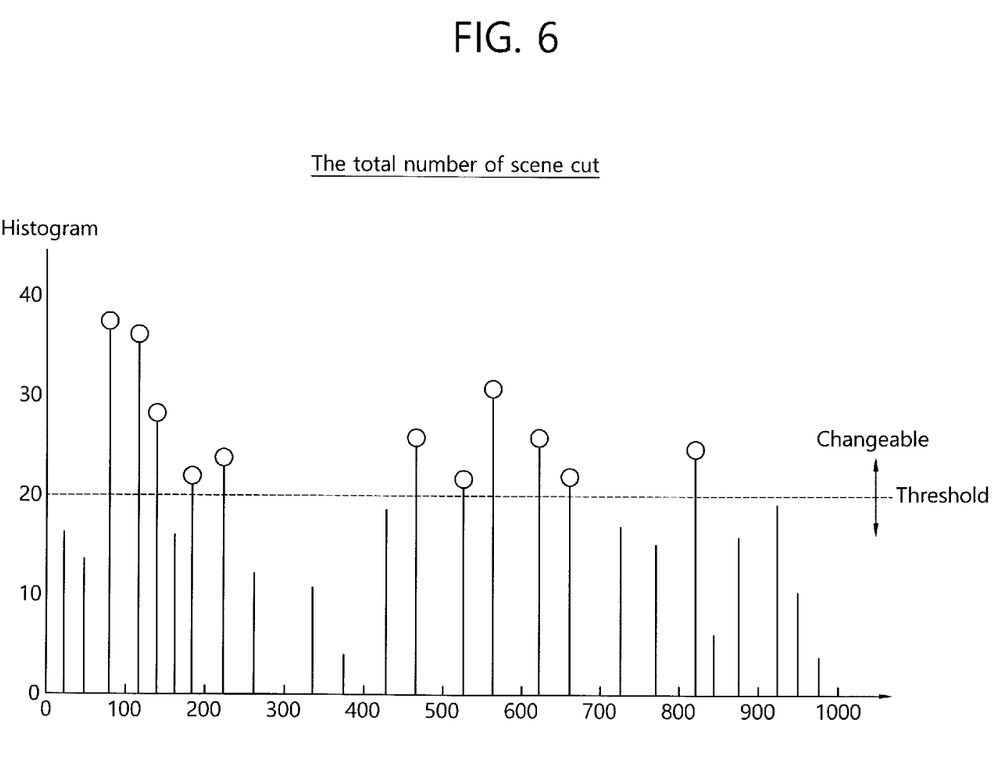
FIG. 6 is a diagram illustrating a histogram analysis result.

FIG. 6 is a diagram illustrating a histogram analysis result.

An embodiment of FIG. 6 may be a histogram to extract a weight calculation result with respect to 1000 frame of 0 frame to 1000 frame. When the threshold value is determined as 20, a frame having a count value higher than 20 (expressed with 'o' in FIG. 6) may be detected as the final scene cut frame. In this case, the threshold value is not limited to one count value of 20, but the threshold value may be optionally changed through the user interface. Further, a specific count value is determined as the threshold value. However, a frame having a higher count value such as a higher certain % in a specific section may be detected as the final scene cut frame.

According to the embodiment of the present invention, a flag for identifying whether a corresponding frame is the final scene cut frame may be allocated to the detected final scene cut frame or frame index information (or time information may be recorded in the detected final scene cut frame through a table or other data storage device for managing the above frame. The flag or the frame index information may be providing to the additional data insertion unit 140.

Insertion of Additional Data

Figure 7:
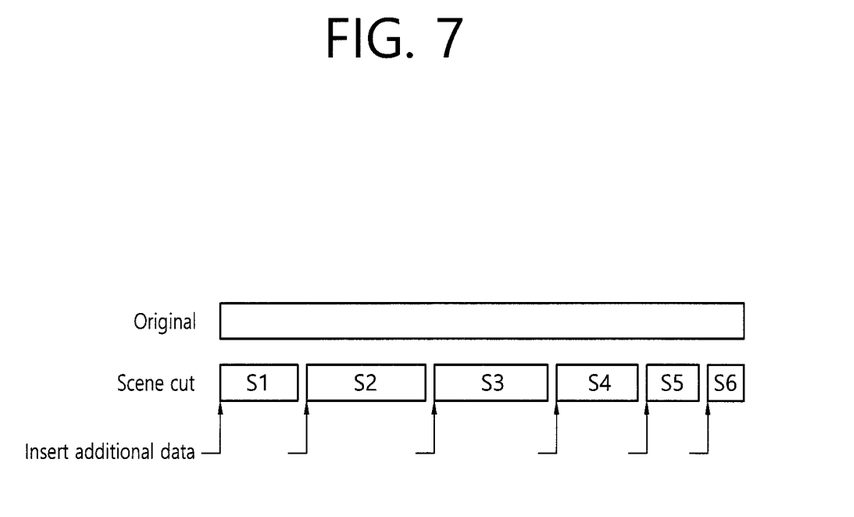
FIG. 7 is a concept diagram illustrating a concept of inserting additional data using a detected scene cut frame.

FIG. 7 is a concept diagram illustrating a concept of inserting additional data using a detected scene cut frame.

Referring to FIG. 7, as a result of applying the method for detecting the scene cut frame according to the embodiment of the present invention to an original bit stream, a plurality of scene cut frames may be detected. An embodiment of FIG. 7 illustrates five scene cut frames. The original bit stream may be divided into six scenes (scene 1 (S1), scene 2 (S2), scene 3 (S3), scene 4 (S4), scene 5 (S5), and scene 6 (S6)) based on the five scene cut frames.

The additional data insertion unit 140 may insert additional data such as a watermark into respective scene cut frames. That is, in an embodiment of FIG. 7, the additional data may be inserted into five scene cut parts, for example, a frame cut to the scene 1 (S1), a frame cut to the scene 2 (S2), a frame cut to the scene 3 (S3), a frame cut to the scene 4 (S4), a frame cut to the scene 5 (S5), and a frame cut to the scene 6 (S6). Alternatively, after the scene cut, the additional data may be further inserted into the frame.

Alternatively, according to another embodiment of the present invention, a representative frame (key frame) for identifying a corresponding (e.g., scene 2 (S2)) may be selected based on the scene cut frame.

A configuration for inserting the additional data (e.g., additional data insertion unit) or a configuration for selecting the representative frame may detect identification information on the scene cut frame based on the flag or the index information from the final frame detector.

Method for Detecting Scene Cut Frame

Figure 8:
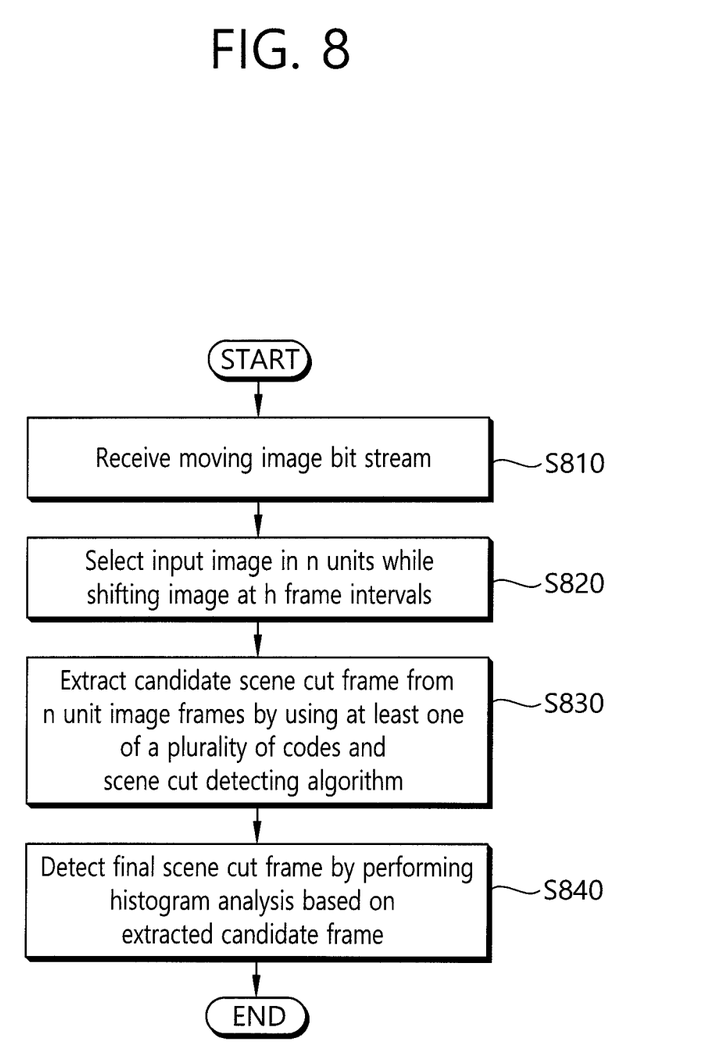
FIG. 8 is a flowchart illustrating a method for detecting a scene cut frame according to an embodiment of the present invention.

FIG. 8 is a flowchart illustrating a method for detecting a scene cut frame according to an embodiment of the present invention.

Referring to FIG. 8, an apparatus for detecting a scene cut frame receives a moving image bit stream (S810).

Next, the apparatus for detecting a scene cut frame may divide and select the received moving image bit stream in a specific unit (e.g., n frame units) while shifting the moving image bit stream at h frame intervals (S820). In this case, both of the n indicating a unit of a selected frame and the h indicating the shifted interval of the frame are a real number greater than 0. Further, the h may be smaller than the n. The divided unit image frame is provided to a candidate frame detector.

A candidate frame detector 120 receives the divided and selected unit image frame to extract a candidate scene cut frame from the unit image frame by using at least one of a plurality of codecs and a plurality of scene cut detecting algorithms (S830). First, the candidate frame detector 120 detects a candidate scene cut frame from a corresponding unit image. A plurality of candidate scene cut frames may be detected from the selected image. Further, attributes of the candidate scene cut frames differ from each other. For example, one frame may be an Intra (I) frame, and a remaining frame may be a frame having a ratio of an Intra area equal to or greater than a predetermined threshold value among a P frame or a B frame. In addition, a frame detected through the scene cut detecting algorithm may be extracted as the candidate scene cut frame. When unit images are partially overlapped with each other because the h is smaller than the n, the candidate frame detector 120 may extract the candidate scene cut frame from an overlapped unit image part. The candidate frame detector 120 may receive frame time information or frame index information on respective input frames from a predetermined memory to apply a flat whether or not a corresponding frame is the candidate scene cut frame or may display time information or an index of the frame selected as the candidate scene cut frame on a time line so that the candidate scene cut frame may be identified from another constituent element.

When the candidate scene cut frame is detected, the weight calculating unit multiplies the selected candidate scene cut frame by a suitable weight. The weight may be applied to each frame calculating unit, and the weight applied candidate scene cut frame value is provided to the final frame detector.

The final frame detector 120 may detect a candidate frame having a count value higher than a threshold value as a final scene cut frame by performing histogram analysis based on the weight applied candidate scene cut frame value (S840). In this case, the histogram analysis may be calculation to calculate summation of the weight applied values. In addition, the final frame detector 130 applies a flag to the final scene cut frame to identify whether the corresponding frame is the scene cut frame or records an index value of the final scene cut frame so that other devices may directly recognize the identified scene cut frame later.

According to another embodiment of the present invention, the additional data insertion unit may be additional included to insert additional data such as the watermark into a frame determined as the final scene cut frame.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. An apparatus for detecting a scene cut, the apparatus comprising:
   an image selector configured to select n number of input image frames among a plurality of input image frames while shifting the plurality of input image frames at h frame intervals;
   a candidate frame detector configured to detect one or more candidate scene cut frames from the selected n number of input image frames using at least one of a plurality of codecs and scene cut detecting algorithms; and
   a final frame detector configured to detect one or more final scene cut frames having a count value higher than a threshold value by performing a histogram analysis with respect to the detected one or more candidate scene cut frames,
   wherein the h is an integer greater than zero, and the h is smaller than the n,
   wherein the n is an integer greater than or equal to 3, and
   wherein the candidate frame detector comprises:
   a plurality of codecs configured to encode or decode the selected n number of input image frames;
   an I frame and intra-area detectors configured to detect at least one of the position of the I frame and the intra-area of the B or P frame among the n number of input image frames according to the encoding or decoding result of the plurality of codecs; and
   a candidate selector configured to select the one or more candidate scene cut frames based on the at least one of the position of the I frame and the intra-area of the B or P frame.

2. The apparatus of claim 1, wherein the candidate frame detector comprises:
   a plurality of candidate frame extracting units configured to extract the one or more candidate scene cut frames from the selected n number of input image frames using the at least one of the plurality of codecs and the scene cut detecting algorithms; and
   a weight calculating unit configured to extract a candidate scene cut frame value with respect to the one or more candidate scene cut frames by applying a weight to each of the one or more candidate scene cut frames.

3. The apparatus of claim 2, wherein the frame extracting unit is operated based on at least one of:
   a first mode to extract the one or more candidate scene cut frames based on the plurality of codecs and a position of an I frame and an intra-area of a B or P frame which are extracted through the plurality of codecs; and
   a second mode to extract the one or more candidate scene cut frames using the scene cut detecting algorithms.

4. The apparatus of claim 1, wherein the candidate selector directly selects the detected I frame as a first candidate scene cut frame, and
   selects a second candidate scene cut frame based on an occupied ratio of the intra-area of the B or P frame in a corresponding frame.

5. The apparatus of claim 1, wherein each of the plurality of codecs comprises a plurality of codecs having different bit rates, and wherein the plurality of codecs are operated in parallel to having different bit rates to detect at least one of the I frame and the intra-area of the B or P frame.

6. The apparatus of claim 1, wherein the I frame and intra-area detector adopts a position of the I frame and an intra-area of the B or P frame from the second frame except for the first frame in the n number of input image frames as a detecting target.

7. The apparatus of claim 1, wherein the plurality of codecs comprise a high efficiency video coding (HEVC) codec and an advanced video coding (AVC) codec, and a WebM codec.

8. The apparatus of claim 1, wherein the final frame detector comprises:
an input unit configured to receive a candidate scene cut frame value detected through at least one of the plurality of codecs or the scene cut detecting algorithms;
a count value accumulating unit configured to accumulate a count value by performing the histogram analysis with respect to the candidate scene cut frame value; and
a frame detecting unit configured to detect the one or more a final scene cut frames (i) by determining whether the accumulated count value is higher than a threshold value or (ii) based on top m frames of the accumulated count value, where, the m is a natural number.

9. The apparatus of claim 1, wherein an additional data insertion unit configured to insert additional data into the detected one or more final scene cut frames.

10. A method for detecting a scene cut frame, the method comprising:
receiving an input frame;
selecting n number of input image frames among a plurality of input image frames while shifting the plurality of input image frames at h frame intervals;
detecting one or more candidate scene cut frames from the selected n number of input image frames using at least one of a plurality of codecs and scene cut detecting algorithms; and
detecting one or more final scene cut frames having a count value higher than a threshold value by performing a histogram analysis with respect to the detected one or more candidate scene cut frames,
wherein the h is an integer greater than zero, and the h is smaller than the n,
wherein the n is an integer greater than or equal to 3, and
wherein the extracting of the candidate scene cut frame comprises:
encoding or decoding the selected n number of input image frames by a plurality of codecs;
detecting at least one of the position of the I frame and the intra-area of the B or P frame among the n number of input image frames according to the encoding or decoding result of the plurality of codecs; and
selecting the one or more candidate scene cut frames based on the at least one of the position of the I frame and the intra-area of the B or P frame.

11. The method of claim 10, wherein the detecting of the candidate scene cut frame comprises:
extracting the one or more candidate scene cut frames from the selected n number of input image frames using the at least one of the plurality of codecs and the scene cut detecting algorithms; and
extracting a candidate scene cut frame value with respect to the one or more candidate scene cut frames by applying a weight to each of the one or more candidate scene cut frames.

12. The method of claim 11, wherein the extracting of the candidate scene cut frame comprises:
operating based on at least one of:
a first mode to extract the one or more candidate scene cut frames based on the plurality of codecs and a position of an I frame and an intra-area of a B or P frame which are extracted through the plurality of codecs; and
a second mode to extract the one or more candidate scene cut frames using the scene cut detecting algorithms.

13. The method of claim 10, wherein the selecting of the candidate scene cut frame comprises at least one of:
directly selecting the detected I frame as a first candidate scene cut frame; and
selecting a second candidate scene cut frame based on an occupied ratio of the intra-area of the B or P frame in a corresponding frame.

14. The method of claim 10, wherein each of the plurality of codecs comprises a plurality of codecs having different bit rates, and
the plurality of codecs are operated in parallel to having different bit rates to detect at least one of the I frame and the intra-area of the B or P frame.

15. The method of claim 10, wherein the detecting at least one of the position of the I frame and the intra-area of the B or P frame comprises adopting a position of the I frame and an intra-area of the B or P frame from the second frame except for the first frame in the n number of input image frames as a detecting target.

16. The method of claim 10, wherein the plurality of codecs comprise a high efficiency video coding (HEVC) codec and an advanced video coding (AVC) codec, and a WebM codec.

17. The method of claim 10, wherein the detecting the frame as the final scene cut frame comprises:
receiving a candidate scene cut frame value detected through at least one of the plurality of codecs or the plurality of the scene cut detecting algorithms;
accumulating a count value by performing the histogram analysis with respect to the candidate scene cut frame value; and
detecting the one or more final scene cut frame (i) by determining whether the accumulated count value is higher than a threshold value or (ii) based on top m frames of the accumulated count value, where, the m is a natural number.

18. The method of claim 10, further comprising: inserting additional data into the detected one or more final scene cut frames.

* * * * *